United States Patent

[11] 3,617,541

[72] Inventor Pei Tai Pan
    Beloit, Wis.
[21] Appl. No. 845,693
[22] Filed July 29, 1969
[45] Patented Nov. 2, 1971
[73] Assignee Fairbanks Morse Inc.
    New York, N.Y.

[54] BIOGRID UNIT AND METHOD
    9 Claims, 3 Drawing Figs.
[52] U.S. Cl. .................................................... 210/17,
                                                        210/150
[51] Int. Cl. .......................................................... C02c 1/04
[50] Field of Search ......................................... 210/150,
                                                    151, 17; 261/112

[56] References Cited
    UNITED STATES PATENTS
    3,084,918  4/1963  Kohl et al. ................... 261/112
    3,301,401  1/1967  Hall ............................. 210/150
    3,313,533  4/1967  Powers ....................... 261/112 X
    3,485,372  12/1969 Nordgard .................... 210/150

Primary Examiner—J. L. De Cesare
Attorney—Petherbridge, O'Neill & Lindgren

ABSTRACT: A sewage treatment unit comprising an open-ended tank including therein a series of spaced substantially vertically disposed permeable fabric members supported in the tank for oscillating movement, the surfaces of each of the members providing such growth areas for biological masses and aeration means for supplying oxygen to the biological masses to facilitate biological oxidation of the sewage in the tank.

PATENTED NOV 2 1971 3,617,541

INVENTOR
PEI TAI PAN
BY Pettersbridge, O'Neill & Ankel.
ATTORNEYS

BIOGRID UNIT AND METHOD

This invention relates to the biological treatment of sewage and other waste material and apparatus therefor.

Heretofore, biological treatment systems, have been generally of the activated sludge type or of the trickling filter type. Both types of these systems, however, have inherent disadvantages. For example, the activated sludge processes for effective operation require that the sludge be kept in suspension by air or mechanical means. However, the sludge solids and liquid carrier move at substantially the same relative rate because the specific gravity of the sludge solids suspension is close to that of water. Thus the immobility of the sludge solids relative to the water, affects the oxygen and nutrient transfer to the micro-organisms in the activated sludge tank. Moreover, activated sludge systems require that activated sludge be taken from the settling tank and returned into the system for continuing process treatment.

In the trickling filter systems the liquid flow rate into the tank is subject to close control requirements, the unit cannot handle flow surges, the filter elements require complicated and expensive support devices and the unit does not operate under conditions wherein the unit is flooded.

With the present invention, these problems and difficulties among others of the prior art substantially overcome by the provision of a biogrid unit which includes a plurality of permeable sheet panels which provide growth areas for micro-organisms which digest solids in the sewage and reduce the BOD content thereof. The panels are constructed of a material which has capillary action capabilities so that moisture is supplied to the micro-organism regardless of the liquid level in the tank. Thus, the unit maintains an effective quantity of micro-organism whether the unit is flooded, the liquid level of the unit is at a predetermined minimum or at some variable level between flooded conditions and lowest liquid level condition. Moreover, the panels are supported so that at least the lower ends thereof are free to sway, oscillate or move in a random manner in response to movement of the liquid in the unit. Advantageously, the unit may be aerated so that the oxygen and nutrient requirements of the micro-organisms may be met. In addition such aeration assists in causing swaying, oscillating or random motion in response to movement of the liquid in the unit. The motion of the sheet panels increases the mass transfer of oxygen and nutrients to the micro-organism on the panels and provides greater opportunity for the fabric of the panels to attract and attach solids which may be suspended in the liquid in the unit.

It is an important object of this invention to provide a sewage treatment unit in which solids contained in the sewage or other waste material are continuously and gradually removed from the sewage or waste material by the action of micro-organisms on swaying or oscillating flexible, corrosion resistant permeable members, such as a plurality of sheets arranged in closely spaced array.

It is a further object of this invention to increase the supply of oxygen growth of micro-organisms on said panels for digestion of solids, by air currents or aerated liquid currents which cause said sheets to oscillate under force exerted by said air or liquid currents. A further object resides in establishing a predetermined low liquid level in the tank in which the lower ends of said sheets are submerged whereby a moisturized surface is maintained throughout substantially the entire area of said sheets regardless of the level of liquid in the tank and to obtain desired micro-organism growth thereon through capillary action of said submerged portions of the sheets.

These and other objects, features, and advantages of the present invention, as well as the details of an illustrative embodiment, will be more fully understood from the following detailed description and from the drawing, in which.

Figure 1:
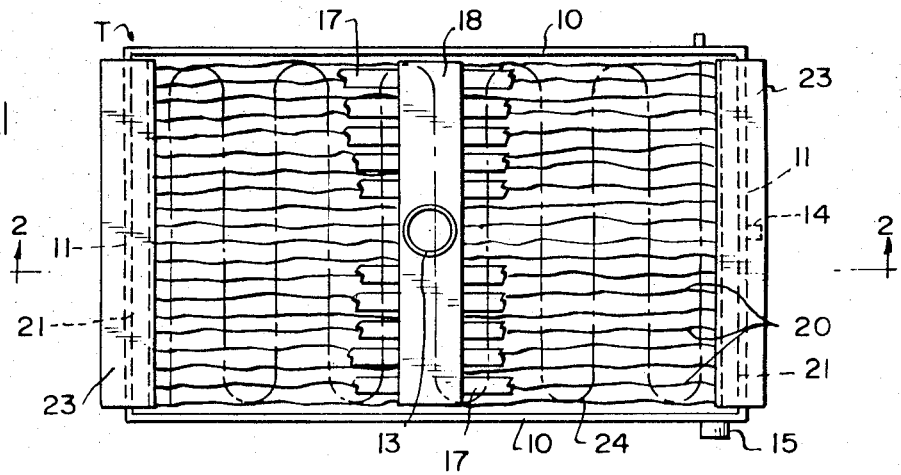
FIG. 1 is a top plan view of a sewage treatment unit in accordance with this invention.
Figure 2:
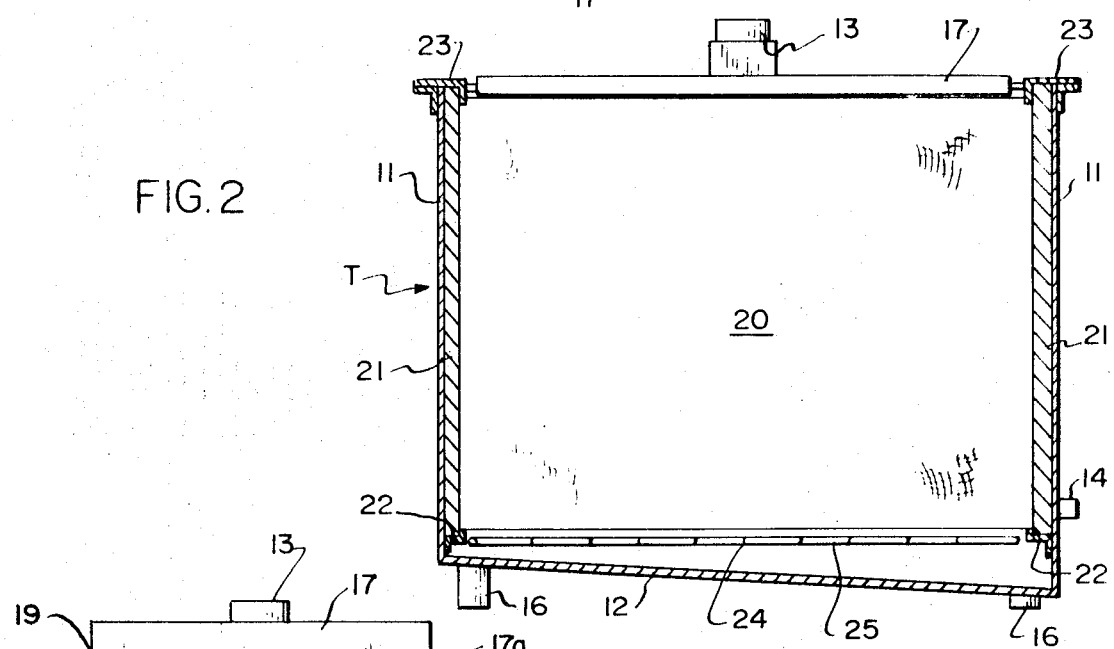
FIG. 2 is a vertical section taken along line 2—2 of FIG. 1.

A typical sewage treatment unit constructed in accordance with the present invention, as disclosed in the drawing, includes a single tank generally designated as T and having upright side and end walls 10 and 11 respectively and a bottom wall 12 to define the confines of a work area in which sewage is received via an overhead tank inlet 13 and from which the sewage, after biological treatment, is discharged via a normally closed tank outlet 14. As shown in FIG. 2, the bottom wall 12 of the tank preferably slopes downwardly toward a drainage opening 15 provided in one of the end walls 11 at a level below the tank outlet 14. Reference numeral 16 designates foot members provided at the corners of the bottom wall 12 for downward bearing engagement with a floor or other suitable platform underlying said bottom wall.

Figure 3:
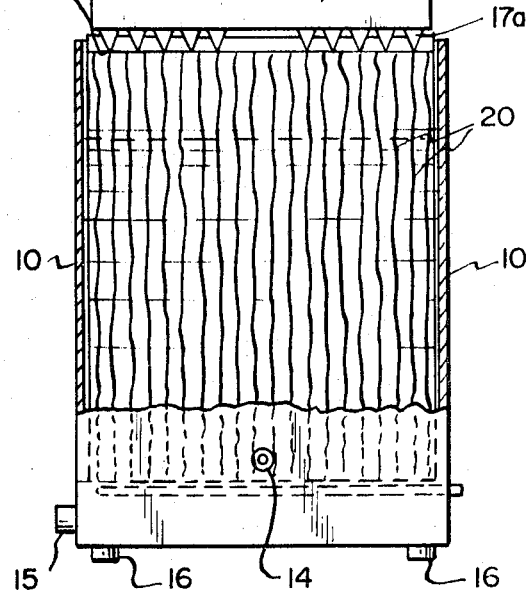
FIG. 3 is an end elevational view with portions in vertical section.

Sewage entering the tank via the inlet 13 is initially distributed by a plurality of spaced distribution or header trays 17 which occupy a fixed horizontal position across the open upper area of the tank T. The trays 17 provide for distribution of the sewage material to the tank there below via a series of spaced elongated troughs 17a formed in the trays 17. These troughs 17a branch in opposite directions from a central area 18 of the tank along spaced-apart lines extending substantially parallel to the sidewalls 10 of the tank and a plurality of slots or openings 19 are (FIG. 3) formed in the base of each trough in spaced-apart relation lengthwise of the trough. It will be appreciated that the sewage may alternatively be introduced into the tank from the bottom thereof or through a sidewall thereof.

Sewage effluent thus flowing into the tank through the openings 19 in the troughs 17a of the trays 17 is directed downwardly in vertical paths occupied by the vertical sheets 20 which serve as a growth media for the biological masses which cause reduction of the BOD content of the sewage effluent.

Each sheet 20 is preferably constructed of permeable flexible clothlike material, such as a fabric of woven glass filaments, (e.g., fiber glass). The material from which the sheet is constructed is capable of producing capillary action whereby the moisture of the sheet can be maintained in the area of the micro-organisms regardless of the liquid level in the tank. It will be appreciated however that the present invention also has applications in circumstances where the liquid level in the tank is generally at the same level. Each sheet 20 extends almost the full distance between opposite end walls of the tank T and the lower end of each sheet 20 occupies a position below the lowest level of liquid in the tank as established by the location of the tank outlet 14.

Preferably each sheet 20 is supported between a pair of rigid supporting strips 21 (FIG. 2) to which the opposite vertical end edges of each sheet 20 is secured. The strips 21 have engagement with strip retainers 22 (FIG. 2) fixed to the inwardly facing surfaces of the end walls of the tank along a horizontal line effective to fix the bottom position of the sheets downwardly of the tank T while a pair of removable strip retainers 23 along the upper rim of the tank provide a channel in which the upper ends of the strips 21 are received and supported so as to maintain the strips 21 in upright position at such distance apart measured lengthwise of the side walls of the tank T so as to allow the sheet 20 secured to said strips 21 to have freedom to move or wave relative to the strips 21 in response to the movement of effluent in the tank. However, the strips 21 occupy fixed positions in relation to the end wall of the tank T facing said strips and the thickness of each strip 21 establishes the spacing between a bacterial growth sheet 20 secured thereto and the sheet 20 secured to the next adjacent strip 21.

Air is preferably supplied to the area between the sheets 20 by means of a lower conduit 24 (FIG. 2) having an inlet port 26 and having a discharge portion occupying the area below the lower ends of the sheets 20, said discharge portion having openings 25 through which air is released in small bubbles along upward paths between the sheets 20. Biological growth on the sheets 20 is accordingly enhanced with oxygen supplied from the openings 25 while such air movement also causes the sheets 20 to oscillate or wave in a random manner. It will be appreciated that liquid in the tank may be circulated as by means of a circulating pump located outside the tank and that air may be dissolved into the circulating liquid outside the tank for introduction into the tank in dissolved form in the circulated liquid.

Thus as the solids of the sewage effluent entering the tank either continuously or intermittently via the dispersion tray 17 collects on the surfaces of the sheets 20, the dissolved solid and suspended material in the effluent undergoes biological oxidation through the action of the micro-organisms formed on the surfaces of the sheets 20. The pulsing or oscillating motion of the sheets 20 during such engagement with the sewage acts to increase the solids mass transfer rate onto the sheets 20 as well as maintaining micro-organism growth on the sheets in that there is enhanced opportunity for the fabric sheets 20 to absorb and attach dissolved and suspended solids thereto which may be suspended in the sewage effluent. This motion of the sheets 20 also aids agglomeration of the solid particles contained in the sewage effluent.

As heretofore indicated, the sheets 20 have the lower ends thereof submerged in the waste liquid contained in the tank, even under conditions when said liquid is at its lowest level as determined by the outlet 14. This level may be at its lower limit because of automatic opening of the outlet 14. The fabric composition of the sheets 20 acts to draw the liquid upwardly throughout the area of the sheets above the liquid level in the tank through capillary action, thereby maintaining a sufficiently moist condition required to maintain continuous micro-organism growth on said sheets, notwithstanding a low liquid level in the tank.

Consequently, a sewage treatment unit incorporating the features of this invention is adapted to accommodate either a complete flooded tank condition when subject to large batches of sewage or to accommodate a low liquid level during intervals of minimum use without substantially effecting the desirable micro-organism growth conditions of the sheets. Hence, the biogrid tank may be utilized as a holding or surge tank, or it may be a part of a system having a separate holding tank. In this event, it is possible to have the effluent discharge means located above the top edges of the panels and near the top edge of the tank, thereby to establish a constant level flooded condition.

Although other features and advantages of the present invention will be readily apparent to those skilled in the art, it is to be understood that what is intended to be encompassed within the scope of the claims hereof are all such features and advantages falling within the scope of invention aforedescribed.

What is claimed is:

1. A sewage treatment unit including a tank having a pair of end walls and a pair of sidewalls, a bottom wall enclosed by said side and end walls, a discharge outlet in one of said walls, means defining an inlet for the entry of sewage effluent into said tank, a series of spaced substantially vertically disposed permeable fabric members supported in said tank for movement in response to flow of liquid in said tank, the surfaces of each of said members providing growth areas for biological masses which digest solids in said sewage and reduce the BOD content thereof, means for maintaining a predetermined minimum level of liquid in said tank whereby the lower ends of said members are in submerged relation to the predetermined minimum liquid level in said tank at all times, whereby said sheets are kept moist by capillary action while the liquid in the tank is at said predetermined minimum lower liquid level, and aeration means for continually supplying a quantity of oxygen to the biological masses in said tank to facilitate biological oxidation of the solid sewage disposed therein.

2. A sewage treatment unit according to claim 1 wherein said members are of corrosion resistant fabric material.

3. A sewage treatment unit according to claim 2 wherein said material is fiber glass.

4. A sewage treatment unit according to claim 1 wherein said members are supported within said tank as to have freedom to sway.

5. A sewage treatment unit according to claim 1 wherein said members are supported within said tank as to have freedom to sway, and wherein air is supplied to the tank to supply oxygen to the biological digestion process taking place on said members while simultaneously causing said members to have relative swaying movement under force exerted by said air.

6. A sewage treatment unit according to claim 1, including a tray disposed adjacent the top of said tank, said tray including a plurality of troughs extending horizontally across said tank and in parallel relationship with respect to one another, each of said troughs including a plurality of openings therein disposed downwardly in use for distributing a quantity of liquid in said tank.

7. The method of treating sewage by biological oxidation including the steps of providing a tank having a bottom wall and sidewalls and including a liquid outlet in at least one of said sidewalls, distributing a liquid containing sewage material into the tank and having a predetermined minimum low level of liquid content in the tank, contacting a series of transverse permeable panels having capillary action characteristics with said sewage material entering said tank, the surfaces of said panels providing growth areas for biological masses which digest solids in said sewage and reduce the BOD content thereof, while the lower end of each of said panels is submerged in said predetermined minimum low level of liquid content, permitting oscillation of said panels in response to the movement of the flow of liquid in said tank, and aerating said biological masses with aeration means to facilitate biological oxidation of the sewage contained in said tank.

8. The method of claim 7 wherein said panels are substantially vertically extending in said tank.

9. The method of claim 8 wherein said liquid and sewage material is introduced into said tank adjacent the top thereof.

* * * * *